(12) United States Patent
Tanaka et al.

(10) Patent No.: US 8,385,255 B2
(45) Date of Patent: Feb. 26, 2013

(54) RADIO APPARATUS AND COMMUNICATION SYSTEM UTILIZING THE SAME

(75) Inventors: Yasuhiro Tanaka, Aichi (JP); Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 1176 days.

(21) Appl. No.: 11/523,023

(22) Filed: Sep. 19, 2006

(65) Prior Publication Data

US 2007/0076582 A1    Apr. 5, 2007

Related U.S. Application Data

(60) Provisional application No. 60/718,328, filed on Sep. 20, 2005.

(51) Int. Cl.
*H04B 7/212* (2006.01)

(52) U.S. Cl. ........ 370/324; 370/208; 370/281; 370/295; 370/310.2; 370/334; 370/344; 370/350; 370/395.41; 370/480; 370/503; 455/13.3; 455/303; 455/422.1; 375/260; 375/349

(58) Field of Classification Search .................. 370/208, 370/281, 295, 334, 339, 344, 395.4, 395.41, 370/395.42, 429, 480
See application file for complete search history.

(56) References Cited

U.S. PATENT DOCUMENTS

| 2005/0180386 | A1* | 8/2005 | Hansen et al. | 370/350 |
| 2006/0107166 | A1* | 5/2006 | Nanda | 714/748 |

FOREIGN PATENT DOCUMENTS

| CN | 1394037 A | 1/2003 |
| EP | 1 187 385 A1 | 3/2002 |
| JP | 2000-040051 A | 2/2000 |
| JP | 2002-051058 A | 2/2002 |
| JP | 2006-179875 | 6/2006 |
| WO | WO 00/41339 | 7/2000 |

OTHER PUBLICATIONS

Gast, 802.11 Wireless Networks: The Definitive Guide, Apr. 25, 2005, 2nd Edition.*
International Search Report issued in corresponding International Application No. PCT/JP2006/318222, dated Feb. 26, 2007.
Bauch G. et al., "Parameter Optimization, Interleaving and Multiple Access in OFDM with Cyclic Delay Diversity," Vehicular Technology Conference, May 17-19, 2004, pp. 505-509, IEEE, Piscataway, NJ.
Samsung, "Further Details on Adaptive Cyclic Delay Diversity Scheme," 3GPP TSG RAN WG1 Meeting #42bis, p. 1-8, October 10-14, 2005, San Diego, CA.
Sinem Coleri, et al., "Channel Estimation Techniques Based on Pilot Arrangement in OFDM Systems," IEE Transactions on Broadcasting, Sep. 2002, pp. 223-229, vol. 48, No. 3.

(Continued)

*Primary Examiner* — Hoon J Chung
(74) *Attorney, Agent, or Firm* — DC Patent Lawyers

(57) ABSTRACT

Using as a reference a known signal assigned to one of a plurality of streams that constitute a packet signal, a control unit applies a cyclic timing shift to known signals assigned to the other streams so as to produce packet signals which are to be transmitted finally. While varying the amount of timing shift, the control unit produces a plurality of packet signals and appends an identification number, with which to uniquely identify each of the plurality of produced packet signals, to each of the packet signals. A baseband processing unit and the like transmit, as a transmission rate inquiry signal, a packet signal constituted by a plurality of streams where the amounts of timing shift are made to differ, and receive a response signal to which the same identification number is appended for the inquiry signal.

3 Claims, 9 Drawing Sheets

OTHER PUBLICATIONS

Chinese Office Action, with English translation issued in Chinese Patent Application No. 200680033573.8, dated Apr. 1, 2010.
Mujtaba et al., "TGn Sync Proposal FRCC Compliance", IEEE 802.11-04/0889r7, Jul. 8, 2005, pp. 1-9.
Japanese Office Action, with English translation, issued in Japanese Patent Application No. 2006-179875, dated Oct. 25, 2011.

* cited by examiner

FIG.3

| HT-STF | HT-LTF | HT-LTF | DATA 1 |
|---|---|---|---|
| HT-STF -400ns | HT-LTF -400ns | -HT-LTF -400ns | DATA 2 -400ns |

FIG.4

| L-STF | L-LTF | L-SIG | HT-SIG | HT-STF1 | HT-LTF1 | HT-LTF5 | DATA A |
| L-STF -50ns | L-LTF -50ns | L-SIG -50ns | HT-SIG -50ns | HT-STF2 -50ns | HT-LTF2 -50ns | HT-LTF6 -50ns | DATA B -50ns |
| L-STF -100ns | L-LTF -100ns | L-SIG -100ns | HT-SIG -100ns | HT-STF3 -100ns | HT-LTF3 -100ns | HT-LTF7 -100ns | DATA C -100ns |
| L-STF -150ns | L-LTF -150ns | L-SIG -150ns | HT-SIG -150ns | HT-STF4 -150ns | HT-LTF4 -150ns | HT-LTF8 -150ns | DATA D -150ns |

RADIO APPARATUS AND COMMUNICATION SYSTEM UTILIZING THE SAME

RELATED APPLICATIONS

This application claims the benefit of U.S. Provisional Patent Application No. 60/718,328, filed on Sep. 20, 2005 the disclosure of which Application is incorporated by reference herein.

BACKGROUND OF THE INVENTION

1. Field of the Invention

The present invention relates to radio apparatuses, and it particularly relates to a radio apparatus using multiple sub-carriers and a communication system utilizing said radio apparatus.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. When the link adaptation technique is to be used in a MIMO system, a transmitting apparatus transmits an inquiry signal on transmission rates to a receiving apparatus, and the receiving apparatus receives the inquiry signal from the transmitting apparatus and then sends, as a response, a desirable transmission rate to the transmitting apparatus.

Under these circumstances, the inventors of the present invention came to recognize the following problems to be solved. Here, a situation is assumed where the transmitting apparatus transmits a plurality of request signals to the receiving apparatus by varying the communication condition to inquire about the transmission rate and, to respond to the respective requests signals, the receiving apparatus sends back a feedback signal. When the receiving apparatus receives the request signal from the transmitting apparatus, the timing and order in which the feedback signals re-sent back may be arbitrary. Note that there is a possibility that the request signal is not received normally. Accordingly, even when the transmitting apparatus receives the feedback signal, it is not necessarily possible for the transmitting apparatus to identify the correspondence between the feedback signals and the request signals. If the accurate correspondence cannot be established between the feedback signal and a plurality of request signals whose communication conditions are made to differ, the link adaptation cannot be performed properly.

SUMMARY OF THE INVENTION

The present invention has been made in view of the foregoing circumstances and a general purpose thereof is to provide a radio apparatus that raises the accuracy of link adaptation.

In order to solve the above problems, a radio apparatus according to one embodiment of the present invention is a radio apparatus for transmitting a packet signal composed of a plurality of streams, and the apparatus comprises: a generation unit which uses as a reference a known signal assigned to one of a plurality of streams forming a packet signal and generates a packet signal to be finally transmitted, by applying a cyclic timing shift within the known signal to a known signal assigned to another stream; and a communication unit which transmits the packet signal generated by the generation unit. The generation unit generates a plurality of packet signals by varying an amount of the timing shift and appends an identification number with which to uniquely identify each of the plurality of generated packet signals, to the each packet signal and the communication unit transmits a packet signal, composed of the plurality of streams, whose timing shift amount is made to differ and to which the identification number is appended, as an inquiry signal on a transmission rate, and receives a response signal to which the same identification number as the inquiry signal is appended.

According to this embodiment, the transmitting apparatus side assigns the sequence numbers to the request signals by varying the communication condition and, and when the receiving apparatus side sends back response signals, it appends the same sequence numbers as those assigned to the request signals to the response signals. As a result, the mis-correspondence between the request signals and the response signals can be prevented and therefore the link adaptation can be accurately done.

The radio apparatus according may further comprise an extension unit which extends the number of streams, forming a packet signal, by multiplying the packet signal by an orthogonal matrix. The generation unit applies the timing shift to a plurality of streams forming the packet signal whose number of streams has been extended.

Another embodiment of the present invention relates also to a radio apparatus. This apparatus is a radio apparatus for transmitting packet signals from a plurality of antennas, and the apparatus comprises: a generation unit which generates a packet signal that contains a known signal; and a communication unit which transmits the packet signal generated by the generation unit from any of the plurality of antennas. The generation unit appends an identification number for uniquely identifying an antenna from which the packet signal is transmitted, to the packet signal and the communication unit transmits the packet signal to which the identification number has been appended, as an inquiry signal on a transmission rate, and receives a response signal to which the same identification number as the inquiry signal is appended.

According to this embodiment, the transmitting apparatus side assigns the sequence numbers to the request signals by varying the communication condition and, and when the receiving apparatus side sends back response signals, it appends the same sequence numbers as those assigned to the request signals to the response signals. As a result, the miscorrespondence between the request signals and the response signals can be prevented and therefore the link adaptation can be accurately done.

Still another embodiment of the present invention relates also to a radio apparatus. This apparatus is a radio apparatus for receiving packet signals, and the apparatus comprises: a receiver which receives an inquiry signal, on a transmission rate, to which an identification number has been appended; a determination unit which determines a transmission rate based on a received signal; a generation unit which generates a packet signal that contains information on the determined transmission rate and the identification number appended to the inquiry signal; and a transmitter which sends back the packet signal generated by the generation unit, as a response signal to the inquiry signal.

According to this embodiment, the transmitting apparatus side assigns the sequence numbers to the request signals by varying the communication condition and, and when the receiving apparatus side sends back response signals, it appends the same sequence numbers as those assigned to the request signals to the response signals. As a result, the miscorrespondence between the request signals and the response signals can be prevented and therefore the link adaptation can be accurately done.

The determination unit may determine the transmission rate based on a received power.

Still another embodiment of the present invention relates to a communication system. This communication system comprises: a transmitting apparatus which transmits a packet signal composed of a plurality of streams; and a receiving apparatus which receives the packet signal transmitted from the transmitting apparatus. The transmitting apparatus includes: a first generation unit which uses as a reference a known signal assigned to one of a plurality of streams forming a packet signal and generates a packet signal to be finally transmitted, by applying a cyclic timing shift within the known signal to a known signal assigned to another stream; and a communication unit which transmits the packet signal generated by the first generation unit. The first generation unit generates a plurality of packet signals by varying an amount of the timing shift and appends an identification number with which to uniquely identify each of the plurality of generated packet signals, to the each packet signal and the communication unit transmits a packet signal, composed of the plurality of streams, whose timing shift amounts are made to differ and to which the identification number are appended, as an inquiry signal on a transmission rate. And the receiving apparatus includes: a receiver which receives the inquiry signal to which the identification number has been appended; a determination unit which determines a transmission rate based on a received signal; a second generation unit which generates a packet signal that contains information on the determined transmission rate and the identification number appended to the inquiry signal; and a transmitter which sends back the packet signal generated by the second generation unit, as a response signal to the inquiry signal.

Still another embodiment of the present invention relates also to a communication system. This communication system comprises: a transmitting apparatus which transmits a packet signal from a plurality of antennas; and a receiving apparatus which receives the packet signal transmitted from the transmitting apparatus. The transmitting apparatus includes: a first generation unit which generates a packet signal that contains a known signal; and a communication unit which transmits the packet signal generated by the first generation unit from any of the plurality of antennas. The first generation unit appends an identification number for uniquely identifying an antenna from which the packet signal is transmitted, to the packet signal and the communication unit transmits the packet signal to which the identification number has been appended, as an inquiry signal on a transmission rate, to the receiving apparatus. And the receiving apparatus includes: a receiver which receives the inquiry signal to which the identification number has been appended; a determination unit which determines a transmission rate based on a received signal; a second generation unit which generates a packet signal that contains information on the determined transmission rate and the identification number appended to the inquiry signal; and a transmitter which sends back the packet signal generated by the second generation unit, as a response signal to the inquiry signal.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 illustrates a packet format in a communication system shown in FIG. 2;

FIG. 4 illustrates a packet format of packet signals transmitted finally in a communication system shown in FIG. 2;

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

An outline of the present invention will be given before a concrete description thereof. The embodiments of the present invention relate to a MIMO system comprised of at least two radio apparatuses. One of the radio apparatuses corresponds to a transmitting apparatus whereas the other corresponds to a receiving apparatus. The transmitting apparatus transmits to the receiving apparatus a request signal with which to inquire about transmission rates. The receiving apparatus receives the request signal from the transmitting apparatus, and sends back a feedback signal to the transmitting apparatus, wherein this feedback signal is a response, from the receiving apparatus, carrying information on the desirable transmission rate in the receiving side. Thereby, link adaptation is carried out between the transmitting apparatus and the receiving apparatus.

The transmitting apparatus varies a communication condition so as to sequentially transmit a request signal inquiring about a transmission rate to the receiving apparatus. The receiving apparatus receives a plurality of request signals and sends back, as a response, a feedback signal carrying information on a desired transmission rate to the transmitting apparatus for each of the plurality of request signals.

The transmitting apparatus receives the feedback signal in response to each request signal and selects, from among transmission rates specified in the feedback signal, a communication condition corresponding to the highest transmission rate and communicates with the receiving apparatus, from then on, by adjusting to the thus selected transmission rate.

Here, since the transmitting apparatus transmits the request signal to the receiving apparatus by varying the condition and then receives a plurality of feedback signals from the receiving apparatus, it is required that a correspondence be established between the request signals and the feedback signals. Thus, the transmitting apparatus appends sequence numbers to the request signals, as identification information for uniquely identifying the request signal, and transmits this request signal with the identification information. When responding to the request signal, the receiving apparatus appends the same sequence number as that of the request signal to a feedback signal and sends back this feedback signal with the sequence number. By employing this structure, the transmitting apparatus associates the request signals with the feedback signals in one-to-one correspondence.

Figure 1:
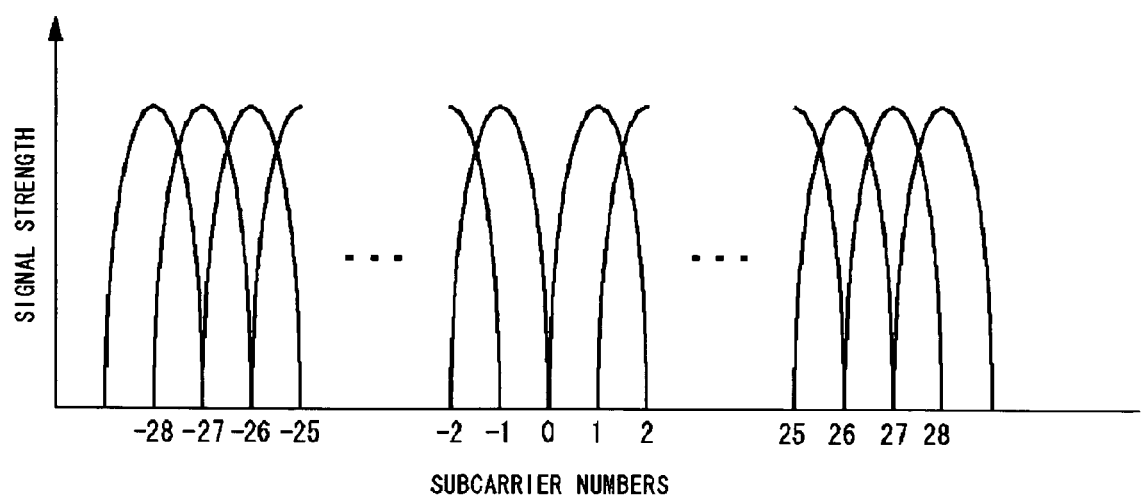
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a system not compatible with a MIMO system (hereinafter such a system as this will be referred to as a "legacy system"). One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" as mentioned earlier. As a result thereof, since the mode of modulation scheme, the coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the data rate will be 9 Mbps.

Figure 2:
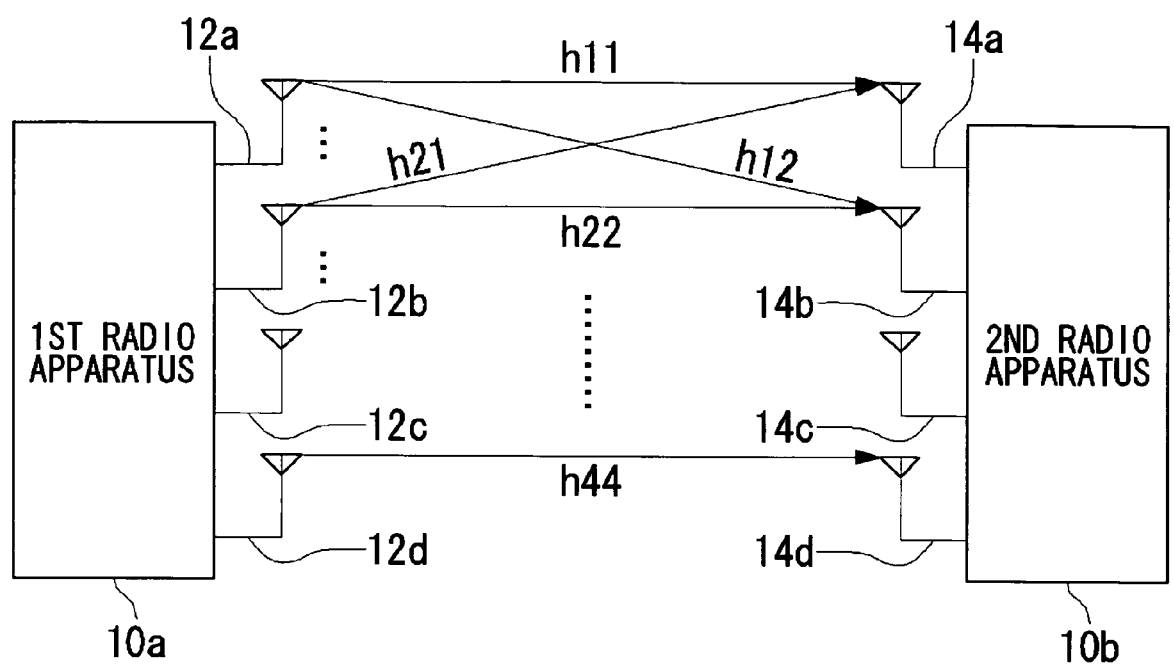
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be explained before the description of a structure of the communication system 100. Assume herein that data are being transmitted from the first radio apparatus 10a to the second radio apparatus 10b. The first radio apparatus 10a transmits respectively the data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12$i$ to the jth antenna 14$j$ is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, the other transmission channels are omitted in FIG. 2. Note that the roles of the first radio apparatus 10a and the second radio apparatus 10b may be reversed.

FIG. 3 illustrates a packet format in a communication system 100. This is the format of packet signal whose number of streams is two. Assume here that data contained in the two streams are to be transmitted. And the packet format corresponding to the first and the second stream are shown in the top and bottom row in FIG. 3, respectively.

"HT-STF" and "HT-LTF" assigned as preambles in the first stream are a known signal, for use in timing estimation, compatible with MIMO system and a known signal, for use in channel estimation, compatible with MIMO system, respectively. "DATA 1" is a data signal.

"HT-STF (−400 ns)", "HT-LTF (−400 ns)" and the like are assigned in the second stream. Here, "−400 ns" and the like indicate the amount of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, a cyclic timing shift with the delayed amount of −400 ns is applied to "HT-STF" in "HT-STF (−400 ns)". Here, CDD is also applied to "DATA 1" and "DATA 2", and the amount of timing shift for them is the same as that for HT-LTF assigned anterior thereto.

In the first stream, HT-LFTs are arranged from the top thereof in the order of "HT-LTF" and "HT-LTF". In the second stream, HT-LFTs are arranged from the top thereof in the order of "HT-LTF" and "−HT-LTF". Here, in this order, HT-LTFs are called "first component" and "second component" in each stream. A desired signal for the first stream is extracted at the receiving apparatus by carrying out an operation of "first component plus (+) second component" for the received signals of all the streams. By performing an operation of "first component minus (−) second component" for the received signals of all the streams, a desired signal for the second stream is extracted at the receiving apparatus.

FIG. 4 illustrates a packet format of packet signals transmitted finally in the communication system 100. The packet signals shown in FIG. 4 are those obtained after the packet signal composed of two streams shown in FIG. 3 have been extended to four streams. "HT-STFs" and "HT-LTFs" assigned to the first stream and the second stream of FIG. 3 underwent an operation by an orthogonal matrix (described later) and the number of streams is increased to four, so that "HT-STF1" to "HT-STF4" are produced. The same applies to "HT-LTF". The CDD whose amounts of timing shift are "0 ns", "−50 ns", "−100 ns" and "−150 ns" are applied to the first to fourth streams, respectively. The amount of timing shift in the CDD at the time of extending the streams is set in a manner that the absolute value thereof is smaller than the absolute value of a timing shift amount used in the CDD applied to HT-STF and HT-LTF for the first time. Similar conversion processing by the orthogonal matrix is performed on "DATA 1" in the first stream and "DATA 2" in the second stream so as to obtain "DATA A", "DATA B", "DATA C" and "DATA D" in the four streams. Further, CDD is executed whose amounts of timing shift are "0 ns", "−50 ns", "−100 ns" and "−150 ns".

Signals with which to maintain the compatibility with legacy system are assigned to a header portion of packet signal. "L-STF", "L-LTF", "L-SIG" and "HT-SIG" correspond to a known signal for timing estimation compatible with legacy system, a known signal for channel estimation compatible with legacy system, a control signal compatible with legacy system, and a control signal compatible with MIMO system, respectively. For example, information on the number of streams is contained in the known signal compatible with MIMO system. Similarly, the CDD whose amounts of timing shift are "0 ns", "−50 ns", "−100 ns" and "−150 ns" is applied to these signals.

The portions from "L-LTF" up to "HT-SIG" use "52" subcarriers in the same way as in the legacy system. Of "52" subcarriers, "4" subcarriers correspond to the pilot signals. On the other hand, the portions corresponding to "HT-LTF" and the like and the subsequent fields use "56" subcarriers.

Figure 5:
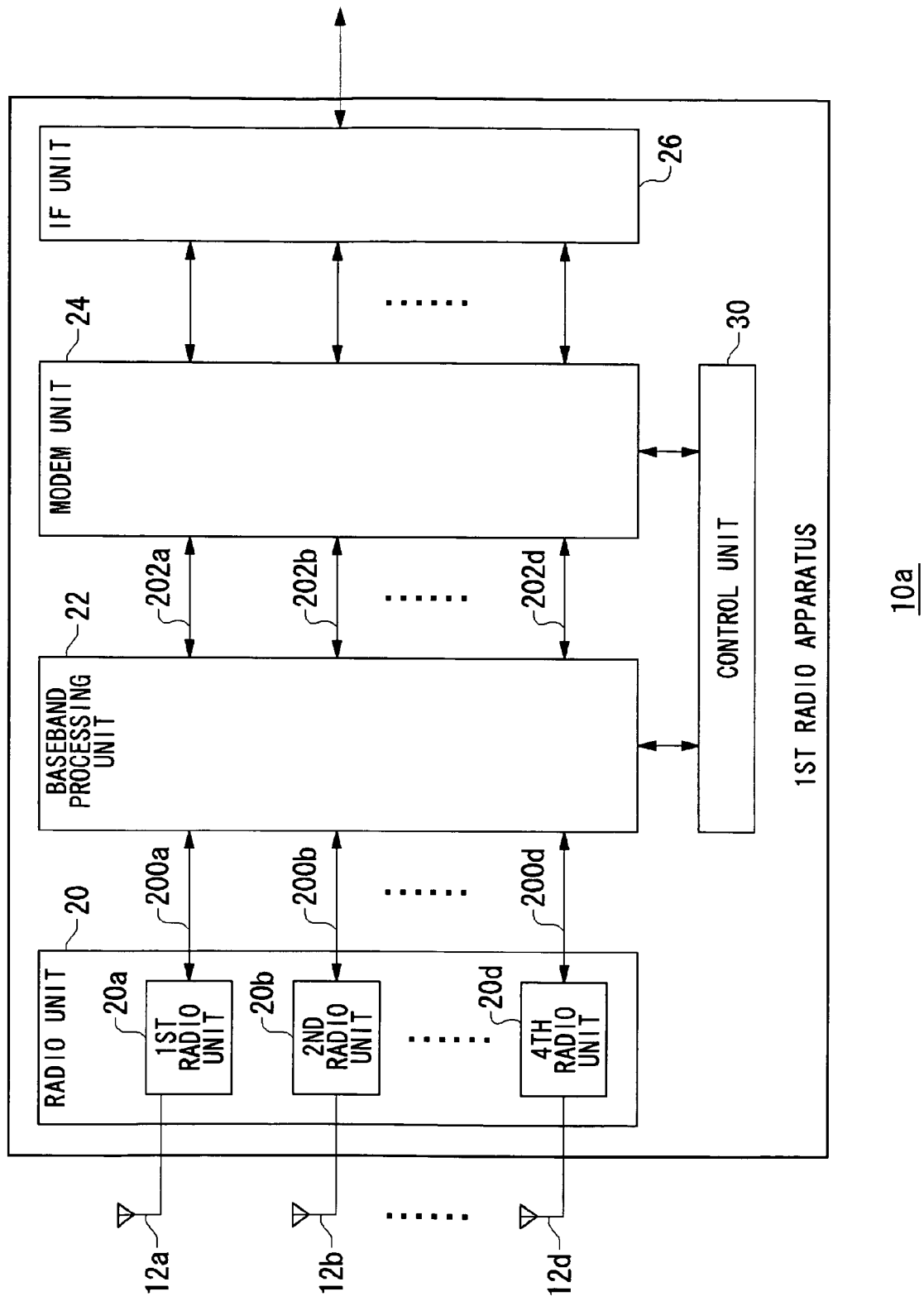
FIG. 5 illustrates a structure of a first radio apparatus shown in FIG. 2.

FIG. 5 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, the following description given of receiving operations corresponds to the processing in the second radio apparatus 10b, whereas the following description given of transmitting operations corresponds to the processing in the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radiofrequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals 200 by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 6:
FIG. 6 illustrates a structure of a frequency-domain signal shown in FIG. 5.

FIG. 6 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like shown in FIG. 3 and the like, a combination of "−26" to "26" is used for one "OFDM symbol".

Now refer back to FIG. 5. The baseband processing unit 22 performs CDD to generate packet signals corresponding to FIG. 3. The baseband processing unit 22 performs multiplication by a steering matrix in order to achieve a modification or deformation of the packet format of FIG. 4. The detailed description on these processings will be given later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. Then the IF unit 26 decodes the one data stream. The IF unit 26 outputs the demodulated data stream. As a transmission processing, the IF unit 26 inputs one data stream, encodes it and then separates it. Then the IF unit 26 outputs the thus separated data to a plurality of modem units 24. It is assumed that the coding rate is specified by the control unit 30 at the time of transmission processing. Here, an example of the coding is convolutional coding, whereas an example of decoding is Viterbi decoding.

The control unit 30 controls the timing and the like of the first radio apparatus 10a. The control unit 30 performs link adaptation by controlling the IF unit 26, the modem unit 24 and the baseband processing unit 22. In the transmitting apparatus, the control unit 30 produces a request signal with which to inquire about transmission rates in the signal format as shown in FIG. 3, extends the number of streams for the signal and then executes CDD so as to covert it into the signal format as shown in FIG. 4.

In the transmitting apparatus, the control unit 30 generates the request signals by varying the amount of timing shift in CDD and assigns sequence numbers thereto so as to be transmitted. In the receiving apparatus, when the request signals whose amounts of timings shift in CDD have been varied are received, a transmission rate desired by the receiving side is determined in response to the receiving status of the request signal and then a feedback signal by which to respond to the transmitting apparatus with information for identifying the thus determined transmission rate is produced. This feedback signal is sent back in a manner that the same sequence number as that appended to the request signal is attached to the feedback signal.

Generally, when the amount of timing shift in CDD is small, the interference is caused among signal streams and the directivity of radio waves gets stronger, so that the difference in the receiving strength of signals becomes large depending on the position of the receiving apparatus. When the amount of timing shift in CDD is large, the separability among the signal streams increases and therefore the difference in the receiving strength of signals at the positions where the receiving apparatus is located becomes small.

The receiving apparatus stores a table which stores transmission rates determined by a combination of parameters that include a modulation scheme, such as BPSK, QPSK, 16-QAM and 64-QAM, a coding rate and the number of antennas, in a manner associated with the index numbers. In the receiving apparatus, the control unit 30 determines a desired transmission rate from this table according to the receiving status of the request signal, and has the index numbers to identify the transmission rate contained in the feedback signal. The transmitting apparatus stores the same table as in the receiving apparatus, and the control unit 30 acquires, from the index numbers contained in the feedback signal, the transmission rate, namely, the parameters such as a modulation scheme and a coding rate desired by the receiving apparatus. Then the control unit 30 communicates with the receiving apparatus according to the acquired parameters and adjusts itself to the transmission rate of the receiving apparatus.

An example of a method in which the control unit 30 determines a desired transmission rate in the receiving apparatus will now be described. The control unit 30 determines a desired modulation scheme according to the received power of the request signal. For example, when BPSK, QPSK, 16-QAM and 64-QAM are available as modulation schemes executable by the receiving apparatus, the minimum received power required to execute each modulation scheme is obtained in advance. Using this as a threshold value, the received signal of the request signal is compared with the threshold value so as to determine a desirable modulation scheme. Further, a desirable coding rate is decided by the received power of the request signal and the like, and a transmission rate determined by the parameters such as the modulation scheme and coding rate will be decided finally.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 7:
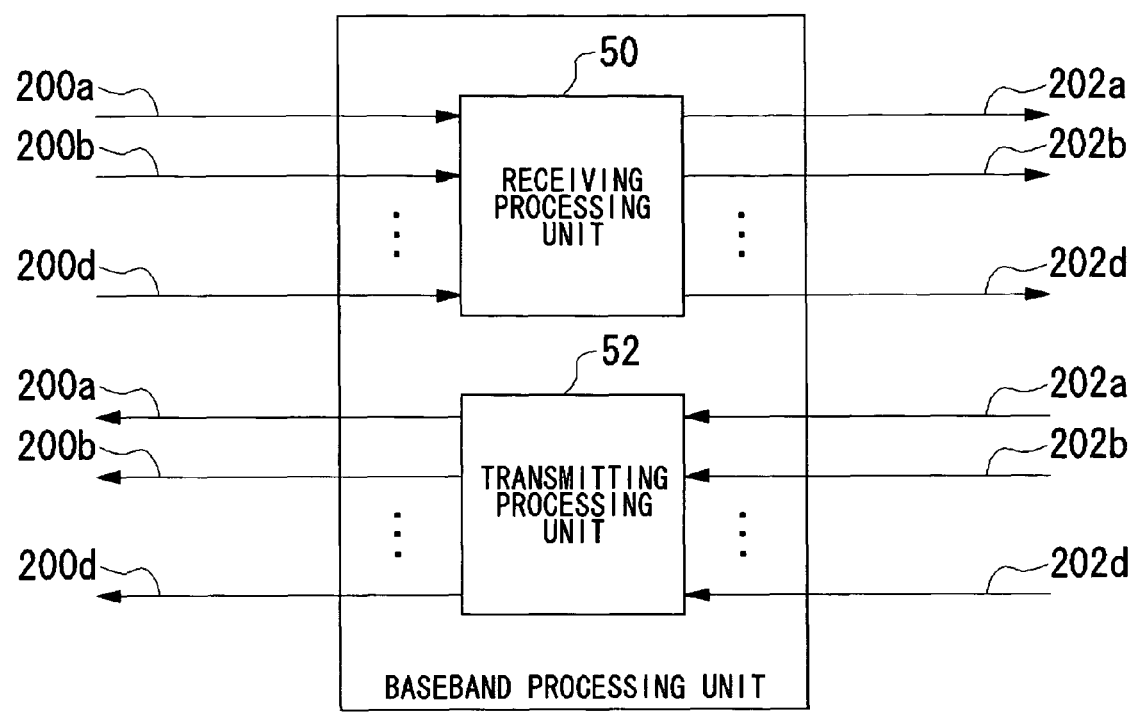
FIG. 7 illustrates a structure of a baseband processing unit shown in FIG. 5.

FIG. 7 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and, for that purpose, derives receiving weight vectors in the frequency domain. Then the receiving processing unit 50 outputs the result of array synthesis as the frequency-domain signal 202.

The transmitting processing unit 52 executes a part, corresponding to a transmission operation, of operations by the baseband processing unit 22. That is, the transmitting processing unit 52 converts the frequency-domain signals 202 so as to generate the time-domain signals 200. The transmitting processing unit 52 associates a plurality of streams respectively with a plurality of antennas 12. The transmitting processing unit 52 also executes CDD as shown in FIG. 3, and carries out the operation by a steering matrix as shown in FIG. 4. Finally, the transmitting processing unit 52 outputs the time-domain signals 200.

Figure 8:
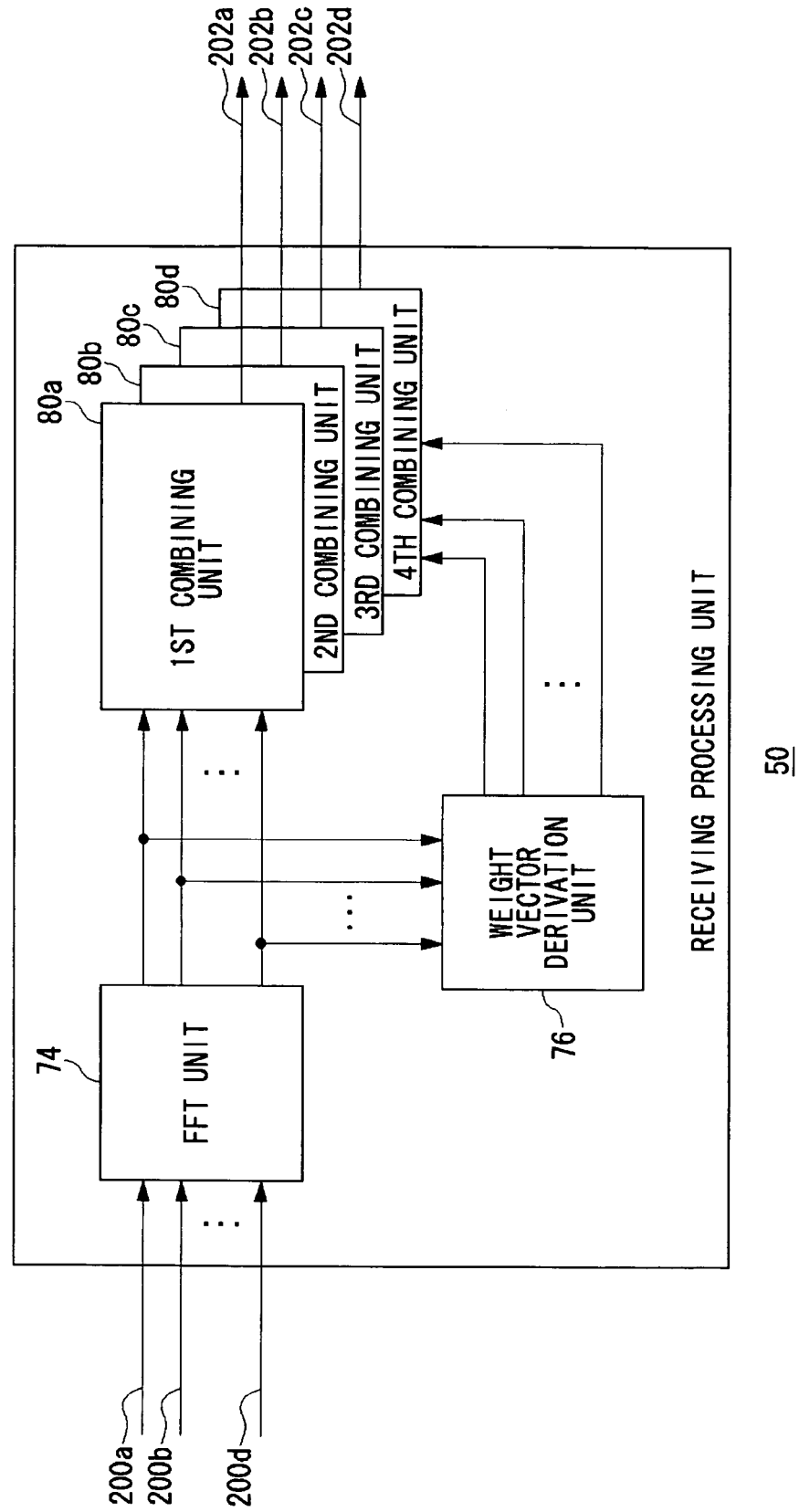
FIG. 8 illustrates a structure of a receiving processing unit shown in FIG. 7.

FIG. 8 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 7. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used to derive a weight vector corresponding to each of a plurality of streams. To derive the weight vector, an adaptive algorithm may be used or a channel characteristics may be used. Since a known technique may be employed in such processing, the explanation thereof is omitted here. As described earlier, when deriving the weights, the weight vector derivation unit 76 carries out an operation of "the first component−the second component+the third component−the fourth component". As described earlier, the weights are finally derived per subcarrier, per antenna 12 and per stream.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplier is to be executed, a value corresponding to one subcarrier is selected from among the frequency-domain values converted by the FFT unit 74. The selected value contains a value corresponding to each antenna 12. Note that both the selected weight and the selected value belongs to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The second combining unit 80b to the fourth combining unit 80d carries out the similar processing so as to derive data corresponding respectively to the second to fourth streams. The derived first to fourth streams are outputted as the first frequency-domain signal 202a to the fourth frequency-domain signal 202d, respectively.

Figure 9:
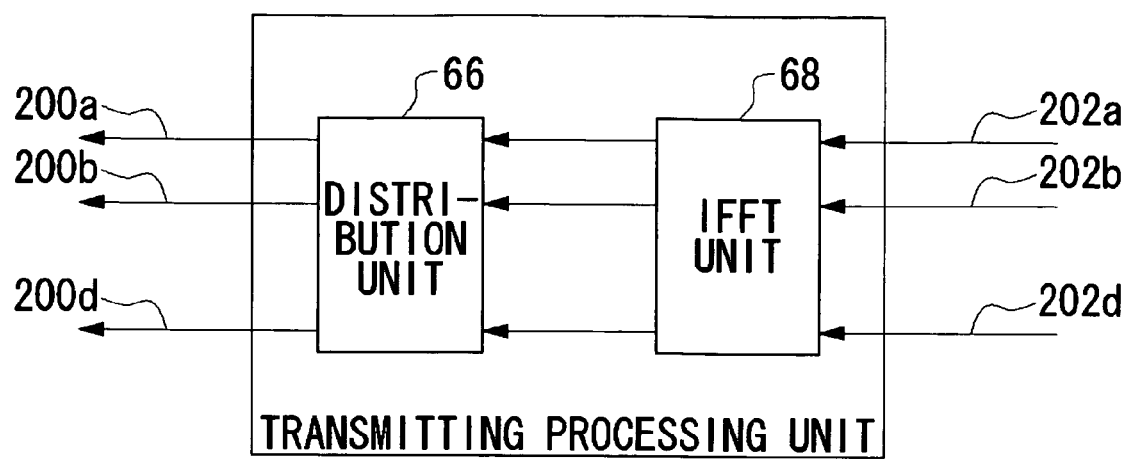
FIG. 9 illustrates a structure of a transmitting processing unit shown in FIG. 7.

FIG. 9 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. The distribution unit 66 performs CDD to produce packet signals corresponding to FIG. 3. CDD is performed as a matrix C expressed by the following Equation (1).

$$C(\lambda) = \text{diag}(1, \exp(-j2\pi\lambda\delta/N\text{out}), \Lambda, \exp(-j2\pi\lambda\delta(N\text{out}-1)/N\text{out})) \quad (1)$$

where δ indicates a shift amount and λ indicates the subcarrier number. The multiplication of C with streams is carried out per subcarrier. That is, the distribution unit 66 performs a cyclic timing shift within a known signal on a stream-by-stream basis. The amount of timing shift is set as shown in FIG. 3.

The distribution unit 66 multiplies respectively the packet signals produced, as in FIG. 3, by a steering matrix so as to increase the number of streams for packet signal up to the number of a plurality of streams. Before carrying out the multiplication, the distribution unit 66 extends the degree of inputted signals to the number of a plurality of streams. Since "HT-STF" and so forth assigned to the first and the second stream are inputted in the case of FIG. 3, the number of signals inputted is "2" and this will be represented by "Nin" here. Accordingly, the inputted data are indicated by a vector of "Nin×1". The number of a plurality of streams is "4", and this is represented by "Nout" here. The distribution unit 66 extends the degree of inputted data to Nout from Nin. In other words, the vector of "Nin−1" is extended to the vector of "Nout×1". In so doing, "0" is inserted to components from the (Nin+1)th row to the Nout-th row.

A steering matrix is expressed by the following Equation (2).

$$S(\lambda) = C(\lambda)W \quad (2)$$

The steering matrix is a matrix of "Nout×Nout". W is an orthogonal matrix of "Nout×Nout". An example of the orthogonal matrices is a Walsh Matrix. Here, λ is the subcarrier number, and the multiplication by a steering matrix is done on a subcarrier-by-subcarrier basis. C denotes CDD as described above. Here, the amounts of timing shift are so defined as to differ for a plurality of streams, respectively. That is, the amounts of timing shift for the first to the fourth stream are defined to be "0 ns", "−50 ns" "−100 ns" and "−150 ns", respectively.

An operation of the communication system 100 structured as above will now be described. The transmitting apparatus sequentially generates the request signals composed of a plurality of streams, affixes the sequence numbers thereto and transmits the request signals with sequence numbers to the receiving apparatus. The receiving apparatus receives a plurality of request signals whose amounts of timing shift in CDD differ, and decides on a desirable transmission rate according to the received power of each request signal. Then the receiving apparatus sequentially generates feedback signals with which to respond, and sends them back to the transmitting apparatus. Here, the feedback signal contains information on the determined transmission rate. The sequence number for the received request signal is attached to this feedback signal.

The transmitting apparatus receives a feedback signal from the receiving apparatus and identifies the request signal corresponding to this feedback signal, from the sequence number contained in this feedback signal. From the correspondence between the request signal and the feedback signal, the transmitting apparatus can acquire the correspondence between the amounts of timing shift in CDD and the desired transmission rates at the receiving side. The transmitting apparatus determines the amount of timing shift by which the transmission rate becomes highest, and, from then onward, the CDD processing is performed with the thus determined timing shift amount and transmits signals to the receiving apparatus.

According to the embodiment of the present invention, the transmitting apparatus assigns the sequence numbers to the request signals by varying the communication condition when link adaptation is to be carried out. Also, when the receiving apparatus sends back the feedback signals in response to the request signals, it appends the same sequence numbers as those assigned to the request signals to the feedback signals. As a result, in the transmitting apparatus side, the request signals and the feedback signals are associated with each other in one-to-one correspondence. Thereby, the miscorrespondence between the request signals and the feedback signals can be prevented and therefore the link adaptation can be accurately done. In particular, when the amount of timing shift in CDD is changed, a timing shift amount suitable for the receiving apparatus can be selected so as to raise the quality of communication.

Another embodiment of link adaptation will now be described. In this embodiment, the transmitting apparatus transmits, from any of a plurality of antennas, a request signal with which to inquire about the transmission rate, whereas the receiving apparatus sends back a feedback signal, with which to respond with a desirable transmission rate, according the receiving status of the request signal. In order to achieve this embodiment, the distribution unit 66 in the above-described baseband processing unit 22 is replaced by a selector which switches the antenna in current use to any of the other antennas so as to transmit the packet signals.

In the transmitting apparatus, the selector sequentially selects a plurality of antennas, appends the sequence number assigned to uniquely identify the selected antenna to the request signal and transmits the request signal from the selected antenna.

When the receiving apparatus receives the request signal, the receiving apparatus determines a desirable transmission rate and responds to the transmitting apparatus with information for uniquely identifying the transmission rate by using a feedback signal containing said information. In so doing, the same sequence number as that assigned to the request signal is appended to the feedback signal.

With the sequence number appended to the feedback signal, the transmitting apparatus can identify which request signal sent from any of the antennas corresponds to the feedback signal. The transmitting apparatus selects an antenna with which the transmission with the highest transmission rate is possible and, from then onward, transmits packets destined to the receiving apparatus from the selected antenna.

According to this embodiment, when packet signals are to be transmitted from any of a plurality of antennas, the selection diversity can be realized which selects a transmitting antenna from which the receiving apparatus can receive at the maximum receiving level.

The present invention has been described based on the embodiments which are only exemplary. It is therefore understood by those skilled in the art that other various modifications to the combination of each component and process are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus for transmitting a packet signal composed of a plurality of streams, the radio apparatus comprising:
   a generator which uses as a reference a known signal assigned to one of a plurality of streams forming a packet signal and generates a packet signal to be finally transmitted, by applying a cyclic timing shift within the known signal to a known signal assigned to another stream; and
   a communicator which transmits the packet signal generated by said generator,
   wherein said generator varies an amount of the cyclic timing shift for each of a plurality of packet signals and appends an identification number, with which to uniquely identify each of the plurality of generated packet signals, to the each packet signal, and
   wherein said communicator transmits the packet signal, composed of the plurality of streams, whose cyclic timing shift amount is made to differ and to which the identification number is appended, as an inquiry signal on a transmission rate, and receives a response signal to which the same identification number as the inquiry signal is appended and which includes information related to the transmission rate.

2. A radio apparatus according to claim 1, further comprising an extender which extends the number of the plurality of streams, forming the packet signal, by multiplying the packet signal by an orthogonal matrix, wherein said generator applies the cyclic timing shift to the plurality of streams forming the packet signal whose number of streams has been extended.

3. A communication system, comprising:
   a transmitting apparatus which transmits a packet signal composed of a plurality of streams; and
   a receiving apparatus which receives the packet signal transmitted from said transmitting apparatus,
   said transmitting apparatus including:
      a first generator which uses as a reference a known signal assigned to one of a plurality of streams forming a packet signal and generates a packet signal to be finally transmitted, by applying a cyclic timing shift within the known signal to a known signal assigned to another stream; and
      a communicator which transmits the packet signal generated by the first generator,
   wherein the first generator varies an amount of the cyclic timing shift for each of a plurality of packet signals and appends an identification number with which to uniquely identify each of the plurality of packet signals, to the each packet signal and
   wherein the communicator transmits the packet signal, composed of the plurality of streams, whose cyclic timing shift amounts are made to differ and to which the identification number are appended, as an inquiry signal on a transmission rate,
   said receiving apparatus including:
      a receiver which receives the inquiry signal to which the identification number has been appended;

a determiner which determines a transmission rate based on the received inquiry signal;

a second generator which generates a packet signal that contains information on the determined transmission rate and the identification number appended to the inquiry signal; and a transmitter which sends back the packet signal generated by the second generator, as a response signal to the inquiry signal.

* * * * *